United States Patent [19]

Nakai et al.

[11] Patent Number: 5,476,402
[45] Date of Patent: Dec. 19, 1995

[54] INTAKE AND EXHAUST STRUCTURE FOR V-TYPE ENGINE

[75] Inventors: Hiroshi Nakai; Yasuhiko Shibata, both of Hamamatsu, Japan

[73] Assignee: Sanshin Kogyo Kabushiki Kaisha, Hamamatsu, Japan

[21] Appl. No.: 212,707

[22] Filed: Mar. 15, 1994

[30] Foreign Application Priority Data

Mar. 15, 1993 [JP] Japan .................................. 5-078544

[51] Int. Cl.⁶ ................................................. B63C 9/08
[52] U.S. Cl. ........................... 440/88; 440/89; 123/195 P
[58] Field of Search .................. 440/53, 88, 89; 60/323, 321, 324; 123/41.82 R, 193.3, 195 P

[56] References Cited

U.S. PATENT DOCUMENTS 4,554,892  11/1985  Amemori et al. ........................ 440/89
4,951,465   8/1990  Torigai .................................. 440/89
5,346,417   9/1994  Isogawa ................................. 440/89

OTHER PUBLICATIONS

1987 Evinrude Catalog, OMC, P.O. Box 663, Milwaukee, Wis.
1987 Yamaha Catalog, Yamaha Motor Corp., P.O. Box 6555, Cypress, Calif.

Primary Examiner—Stephen Avila
Attorney, Agent, or Firm—Knobbe, Martens, Olson & Bear

[57] ABSTRACT

A number of embodiments of V-type outboard motors including 4-cycle engines with a exhaust system being disposed between the cylinder banks so as to simplify the exhaust manifolding and permit it to flow downwardly directly to the exhaust pipe in the driveshaft housing lower unit so as to reduce engine height. Various porting and cooling arrangements are disclosed. The induction system for the engine is disposed on the outside of the engine and a variety of induction systems and throttle control arrangements are also disclosed.

21 Claims, 12 Drawing Sheets

INTAKE AND EXHAUST STRUCTURE FOR V-TYPE ENGINE

BACKGROUND OF THE INVENTION

This invention relates to an intake and exhaust structure for a V-type engine and more particularly to an improved exhaust and intake system for an outboard motor embodying a V-type engine.

The requirement of compact construction for the powerhead of outboard motors is well known. It is desirable to maintain the powerhead as compact as possible in order to avoid unnecessary obstruction of the operator's view. In addition, it is desirable to maintain a relatively low center of gravity of the powerhead so as to assist in the tilt and trim operation and also to ensure against intrusion of the powerhead into the body of the watercraft.

With the increased emphasis on larger watercraft and more powerful engines, resort has been had to the use of multiple cylinder engines so as to suit the requirements of the watercraft and operators. However, when multiple cylinder engines are employed, the problems of maintaining a compact construction are magnified. In order to provide a more compact arrangement for multiple cylinder engines, it has been proposed to employ V-type engines in outboard motors.

However, there is a another facet of outboard motor construction that makes the design of the powerhead difficult. This is the fact that the engine is normally positioned so that its output shaft rotates about a vertically disposed axis rather than horizontally disposed as with most vehicle applications. This presents certain problems, particularly in conjunction with the design of the induction and exhaust system for the engine. These problem become particularly difficult in conjunction with V-type engines.

In addition to the aforenoted problems, there is recently an emphasis towards the use of 4-cycle engines as the power plant of an outboard motor. Four-cycle engines avoid some of the emission problems associated with 2-cycle engines. However, the 4-cycle engines present additional problems not normally associated with 2-cycle engines due to the fact that the induction and exhaust ports of the engine are formed in the cylinder head normally with a 4-cycle engine while they are formed generally in the cylinder block with a 2-cycle engine.

In the exhaust systems for outboard motors, the exhaust gases are generally transferred downwardly from the powerhead to the driveshaft housing lower unit wherein a silencing system is provided that includes an underwater high speed exhaust gas discharge. The driveshaft housing lower unit permits the provision of silencing devices such as expansion chambers and the like since the space available there is normally greater than that in the powerhead. However, the downward routing of the exhaust gases provide certain problems, particularly in conjunction with V-type engines.

With a V-type engine, it is the normal practice to provide the exhaust manifolds on the outer periphery of the engine and the induction system is provided in the valley between the cylinder banks. However, this placement has certain disadvantages.

In the first instance, to route the exhaust gases downwardly into the driveshaft housing, it is necessary to provide, with a V-type engine, a pair of exhaust manifolds one on the outside of each cylinder bank. However, these exhaust gases normally are delivered to an exhaust pipe that is positioned centrally in the driveshaft housing so as to maintain a compact configuration and to avoid interference with the driveshaft which is driven by the engine output shaft. Hence, when the exhaust manifolds are on the outside of the cylinder banks, it is necessary to pass them under the cylinder banks to a common discharge opening positioned beneath the engine. This necessitates elevation of the engine to provide the collection beneath it and raises the center of gravity.

In addition, when the exhaust manifolds are on the outside of the cylinder bank and the induction system is in the valley between the cylinder banks, the intake manifolding must extend rearwardly in the powerhead beyond the cylinder banks to the air inlet device. If carburetors are employed as charge formers, the induction system is further lengthened thus increasing the overall size of the powerhead and specifically the engine thereof.

It is, therefore, a principal object of this invention to provide an improved exhaust and inlet system for a V-type engine utilized in an outboard motor so as to provide a more compact and lower overall construction.

It is a further object of this invention to provide an improved exhaust system for a V-type engine for an outboard motor that will permit central discharge of the exhaust gases and a compact arrangement.

It is a further object of this invention to provide an improved induction system for a V-type engine for use in an outboard motor that will provide a compact assembly and will not increase the fore and aft length of the engine.

SUMMARY OF THE INVENTION

This invention is adapted to be embodied in an outboard motor comprised of a powerhead having an internal combustion engine and a surrounding protective cowling. A driveshaft housing lower unit depends from the powerhead and contains a propulsion device driven by the engine for propelling an associated watercraft. The engine is comprised of a V-type 4-cycle engine that is comprised of a pair of angularly disposed cylinder banks each at containing at least one cylinder bore and defining a valley therebetween. Cylinder heads are affixed to the cylinder bank at one end of the cylinder bore and close the cylinder bores. Pistons reciprocate in the cylinder bores and drive a crankshaft journal at the other end of the cylinder bores about a vertically disposed axis for driving the propulsion device. Exhaust ports are provided for each of the cylinders opening into the valley between the cylinder banks and an exhaust manifold transfers exhaust gases from these exhaust ports downwardly from the powerhead into the driveshaft housing lower unit.

DETAILED DESCRIPTION OF THE PREFERRED EMBODIMENTS OF THE INVENTION

Figure 1:
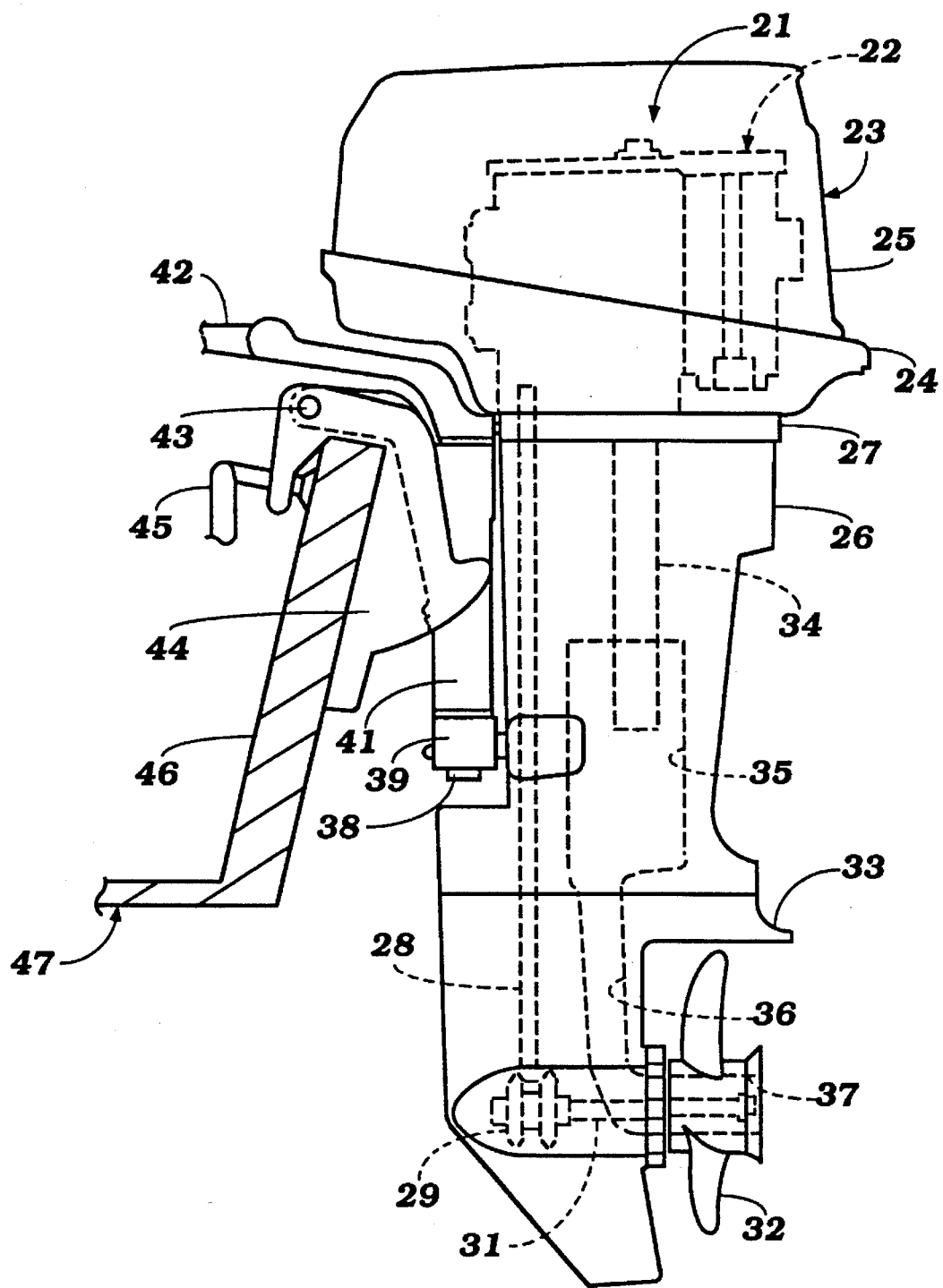
FIG. 1 is a side elevational view of an outboard motor constructed in accordance with a first embodiment of the invention, shown attached to the transom of an associated watercraft shown partially and in cross section.

Referring now in detail to the drawings and initially primarily to FIG. 1, an outboard motor constructed in accordance with a first embodiment of the invention is identified generally by the reference numeral 21. The outboard motor 21 includes a powerhead that is comprised of a powering internal combustion engine 22 which, in all embodiments of the invention, is of the V-type and operates on a 4-stroke principle. As will become apparent to those skilled in the art, certain facets of the invention may be employed in conjunction with 2-stroke engines but the invention has particular utility with 4-stroke engines and particularly those with the cylinder banks arranged at a "V" angle. As will become apparent, the number of cylinders in each cylinder bank can vary without departing from the invention.

The engine 22 is surrounded by a protective cowling, indicated generally by the reference numeral 23 which is comprised of a lower tray portion 24 and a removable upper cowling portion 25.

A driveshaft housing 26 depends from the powerhead and has a spacer plate 27 affixed to its upper end upon which the engine 22 is mounted in a well known manner. The engine 22 has its output shaft coupled to a driveshaft 28 which is rotatably journalled within the driveshaft housing 26 in a known manner.

The lower end of the driveshaft 28 drives a conventional forward neutral reverse bevel gear transmission 29 which is drivingly coupled to a propeller shaft 31 on which a propeller 32 is affixed in a known manner. This mechanism is supported within a lower unit 33 affixed to the lower end of the driveshaft housing 26 in a well known manner.

The engine 22 has an exhaust system which communicates with an exhaust pipe 34 that is affixed to the underside of the spacer plate 27 in a manner which will be described and which discharges the exhaust gases from the engine 22 into an expansion chamber 35 formed in the driveshaft housing 26 in a well known manner. This expansion chamber 35 communicates with an underwater exhaust gas discharge passage 36 that extends into the lower unit 33 and terminates in a through-the-hub propeller high speed underwater exhaust gas discharge 37 in a manner well known in this art. The exhaust system may further include an above the water low speed exhaust gas discharge (not shown) for discharging the exhaust gases directly to the atmosphere rather than through the body of water in which the watercraft is operating when operating at low speeds as is also well known in this art.

A steering shaft 38 is affixed to the driveshaft housing 26 by means that includes a lower bracket 39. This steering shaft is journalled for steering movement about a vertically extending steering axis within a swivel bracket 41. A tiller 42 is affixed to the upper end of the steering shaft 38 for steering of the outboard motor 21 in a well known manner.

The swivel bracket 41 is pivotally connected by means of a pivot pin 43 to a clamping bracket 44 for tilt and trim movement of the outboard motor 21 as is also well known in this art. The clamping bracket 44 includes a clamping device 45 for detachably affixing the outboard motor 21 to a transom 46 of an associated watercraft 47 shown partially and in cross section.

Figure 2:
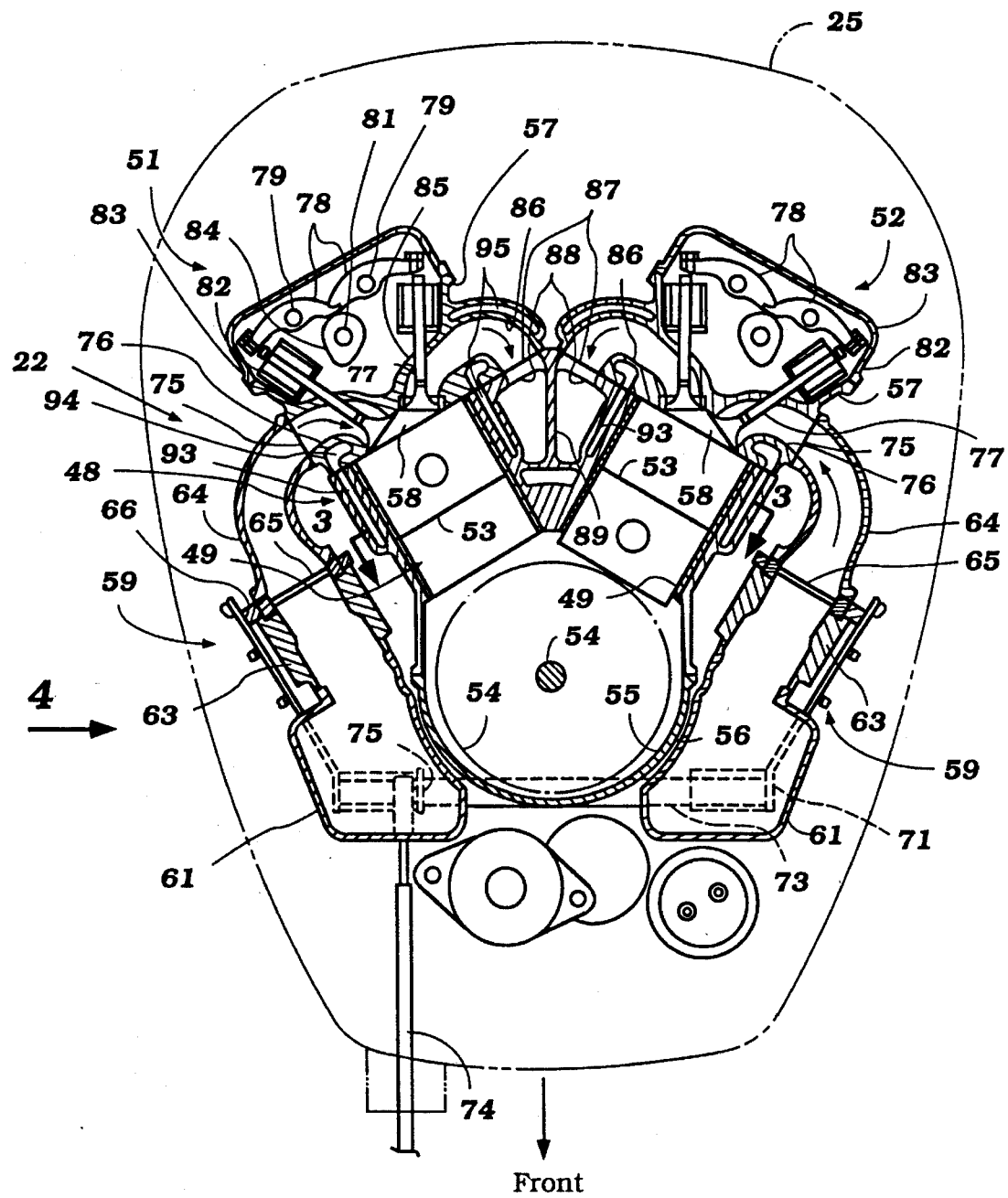
FIG. 2 is an enlarged top plan view of the powerhead, showing the protective cowling in phantom and the engine in cross section.
Figure 3:
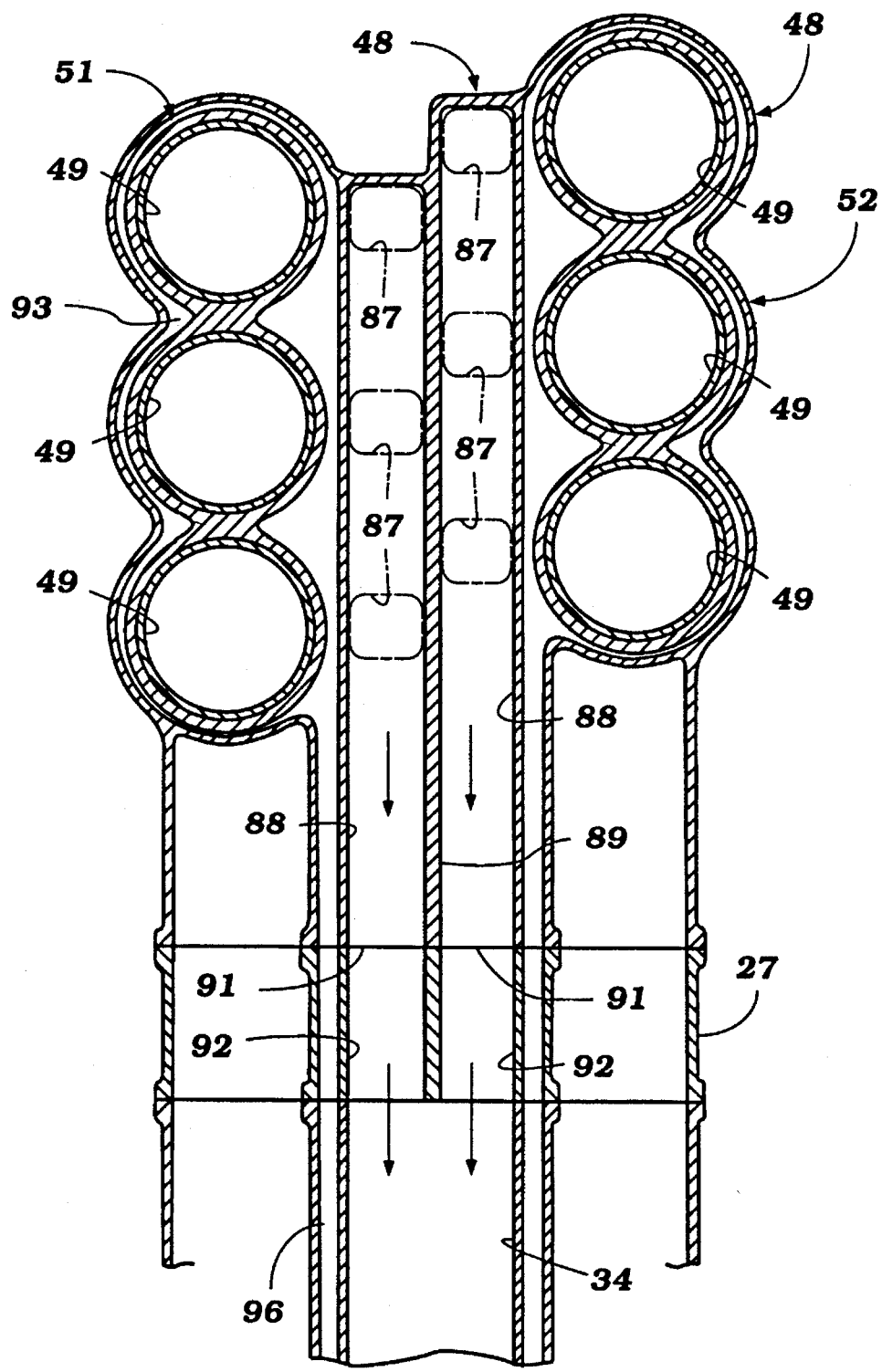
FIG. 3 is a further enlarged cross-sectional view taken along the line 3—3 of FIG. 2 and shows the exhaust manifolding for the engine.
Figure 4:
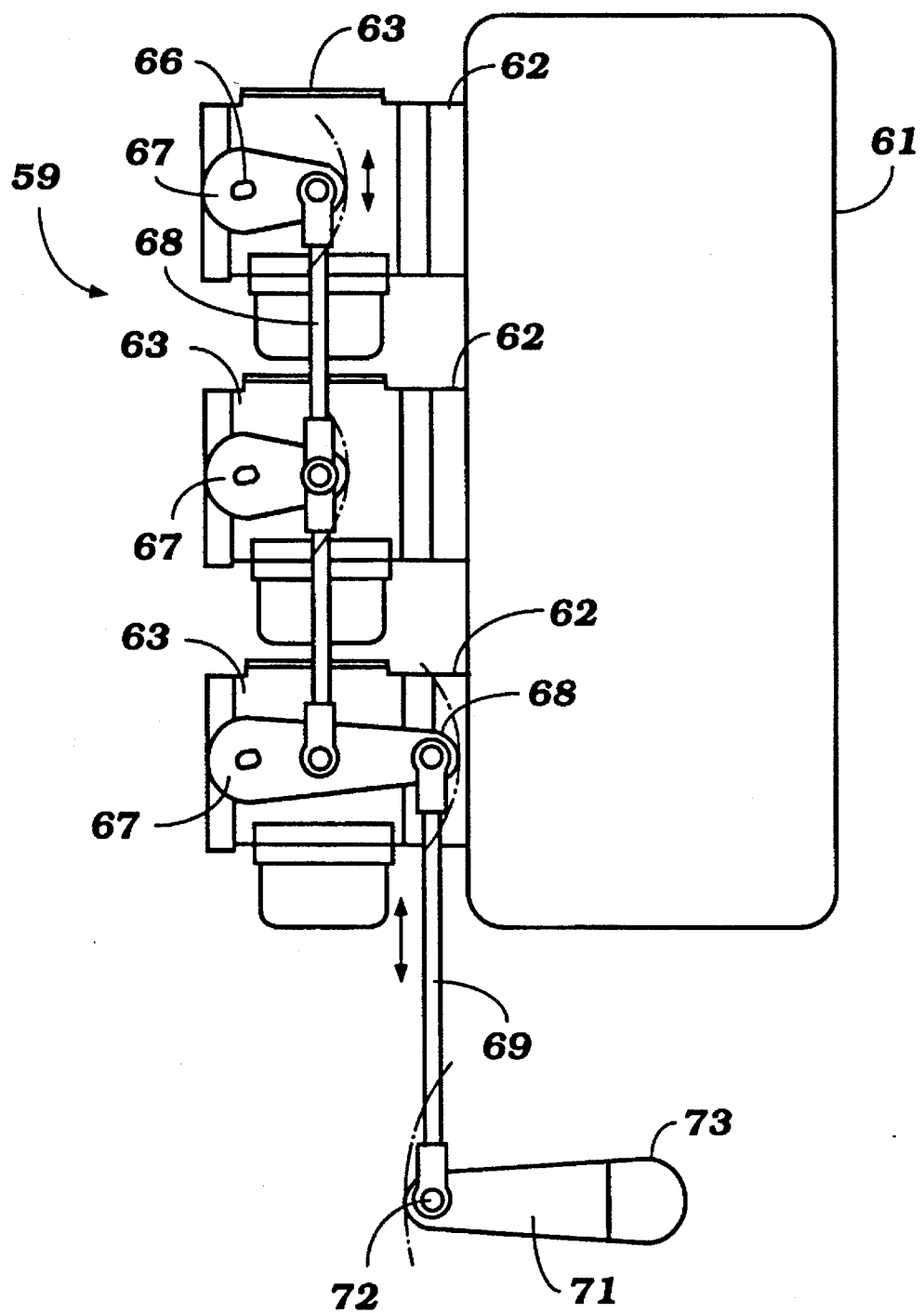
FIG. 4 is an enlarged side elevational view taken generally in the direction of the arrow 4 in FIG. 2 and shows the throttle valve arrangement for this embodiment.

The construction of the outboard motor 21 as thus far described may be considered to be conventional and since the invention deals primarily with the induction and exhaust system for the engine 22 other details of the construction of the outboard motor 21 are not believed to be necessary to enable those skilled in the art to practice the invention. The induction and exhaust system of this embodiment and further details of the construction of the outboard motor 22 will now be described by particular reference to FIGS. 2 through 4.

As has been noted, the engine 22 is of the V-type and to this end it is provided with a cylinder block 48 that is formed with a pair of cylinder banks each of which has 3 vertically disposed cylinder bores 49 formed by cylinder liners. The cylinder liners 49 may be pressed or cast in place in the cylinder block 48 in a known manner. As is typical with V-engine practice, the cylinder banks, indicated generally by the reference numerals 51 and 52 are staggered relative to each other in a vertical direction as clearly shown in FIG. 3. Although the engine 22 in this embodiment is of the V-6 type, as has been previously noted, it will be readily apparent to those skilled in the art how the invention can be employed with V-type engines having any number of cylinders in each cylinder bank.

Pistons 53 are supported for reciprocation in each of the cylinder bores 49 and are connected by means of connecting rods (not shown) to the throws of a crankshaft 54. The crankshaft 54 is rotatably journalled within a crankcase chamber 55 formed by the skirt of the cylinder block 48 and a crankcase member 56 that is affixed to the cylinder block 48 in any known manner, As is typical with outboard motor practice, the crankshaft 54 rotates about a vertically extending axis. The crankshaft 54 is coupled in a suitable manner to the driveshaft 28 for driving it. This coupling may either be via a direct spline connection or through a gear transmission system.

Each cylinder bank 51 and 52 is further comprised of a respective cylinder head 57 that is affixed to a cylinder block 48 in a known manner and which has recesses 58 that cooperate with the cylinder bores 49 and pistons 53 to form the combustion chambers of the engine 22.

In order to provide a more compact assembly for the outboard motor 21, the engine 22 is disposed so that the crankshaft 54 is forwardly disposed in the protective cowling 23 and the cylinder heads 57 are rearwardly disposed. This permits the powerhead to have a relatively narrow configuration which tapers outwardly toward the rear as clearly shown in FIG. 2 because of the divergence of the cylinder banks 51 and 52.

Induction systems, indicated generally by the reference numeral 59, are provided for delivering a fuel air charge to the combustion chambers including the combustion chamber recesses 58 of the cylinder heads 57. Each induction system includes an air inlet and silencing device 61 which is disposed on a respective side of the crankcase member 56 and positioned in close proximity to it. These induction devices 61 have atmospheric inlet openings (not shown) that draw air from within the protective cowling 23. The cowling 23 and specifically the main cowling member 25 is provided with an atmospheric air inlet so as to permit air to be drawn from the atmosphere to the interior for induction by the induction systems 59.

Each inlet device 61 is provided with 3 outlet portions 62 each of which cooperates with the air inlet horn of a respective carburetor 63. The carburetors 63 are vertically spaced and each serves a respective runner of an intake manifold 64. The carburetors 63 have any type of configuration and are supplied with fuel from a fuel supply system in a well known manner. However, the carburetors 63 are provided with throttle valves 65 which are mounted on respective throttle valve shafts 66 at the discharge ends of the carburetors 63. These throttle valve shafts 66 each have affixed to them a respective throttle lever 67.

The throttle levers 67 are all connected to a linkage system 68 so that the throttle valves 65 will all be opened and closed at the same time. The lower most throttle lever 67 of each induction system 59 is provided with an actuating lever portion 68 that is connected to a respective throttle rod 69 by means of a pivotal connection. The lower ends of the throttle rods 69 are pivotably connected to respective throttle levers 71 by means of a pivotal connection 72. The throttle levers 71 on each side of the engine are connected to a common throttle valve shaft 73 which, in turn, is operated by a bowden wire actuator 74 in a manner well known in this art from a remote position within the watercraft 47. This bowden wire actuator 74 is connected to a further throttle lever 75 affixed to the throttle valve shaft 73.

The intake manifolds 64 have their respective runners serving intake ports 75 formed in the outer side of the cylinder heads 57. Each intake port 75 communicates with a respective intake passage 76 extending through the intake or outer side of the cylinder heads 57 and terminating at a valve seat, the flow through which is controlled by a poppet type intake valve 77 supported for reciprocation within the cylinder head 57 in a known manner. The intake valves 77 are operated by means of rocker arms 78 pivoted in the cylinder head 57 on a rocker arm shaft 79. A crankshaft driver camshaft 81 is journalled in each cylinder head assembly 57 and has cam lobes 84 that operates the rocker arms 78 for controlling the opening of the intake valve 77 in a manner well known in the art. The intake valve 77 are urged toward their closed position by respective valve springs 82. This valve actuating mechanism is enclosed by a cam cover 83 affixed to the respective cylinder head 57 in a well known manner.

Rocker arms 78 also operated by lobes 84 of the camshaft 81 operate exhaust valves 85 that supported within the cylinder heads 57 and each associated with a respective combustion chamber recess 58. These exhaust valves 85 control the flow through exhaust passages 86 formed in the respective cylinder heads 57 and which in this embodiment have a generally U-shaped configuration so as to terminate at their lower ends in exhaust ports 87 formed in the underside of the cylinder heads 57 outwardly of the cylinder bores 49 and in the valley formed between the cylinder banks 51 and 52.

These exhaust ports 87 communicate with respective exhaust manifolds 88 formed integrally within the cylinder block 48 and in the valley between the cylinder banks 51 and 52. The manifolds 87 are separated from each other by an integral inner wall 89, this construction being best shown in FIG. 3.

Because the exhaust manifolds 88 are formed in the valley formed between the cylinder banks 51 and 52 the engine can be extremely compact and, furthermore, the exhaust gases can be delivered downwardly through exhaust discharge ends 91 that communicate with respective exhaust passages 92 formed in the spacer plate 27 and which communicate with the inlet end of the exhaust pipe 34 which, as have been noted, is affixed in a suitable manner to the underside of the spacer plate 27. Hence, the exhaust gases can be delivered to the exhaust pipe 34 centrally in the driveshaft housing 26 without having to elevate the engine 22 above the spacer plate 27. Hence, the construction can be extremely compact and yet afford the desired point of discharge of the exhaust gases.

The engine 22 is also water cooled by water that his drawn from the body of water in which the watercraft is operated by means of a water pump (not shown) driven by the driveshaft 28 at the interface between the driveshaft housing 26 and lower unit 33 as is typical in the outboard motor art. This water is then circulated through a coolant jacket 93 formed in the cylinder block 48 around each of the cylinder bores 49. This coolant is then discharged into a cooling jacket 94 formed in the cylinder heads 57 around at least the lower side of the intake passages 76 and then is transferred to further cooling jacket portions 95 which encircle the exhaust passages 86 in the cylinder head 57 and which also communicate with the cooling jackets 93 formed around the cylinder liners 49 so as to ensure good cooling of the exhaust manifolds 88 and assessed in the silencing of the exhaust gases. This coolant is then discharged downwardly through a cooling jacket 96 that is formed around the exhaust pipe 34 which may be discharged into the expansion chamber 35 for return to the body of water in which the watercraft is operating through the hub propeller exhaust discharge 37.

Figure 5:
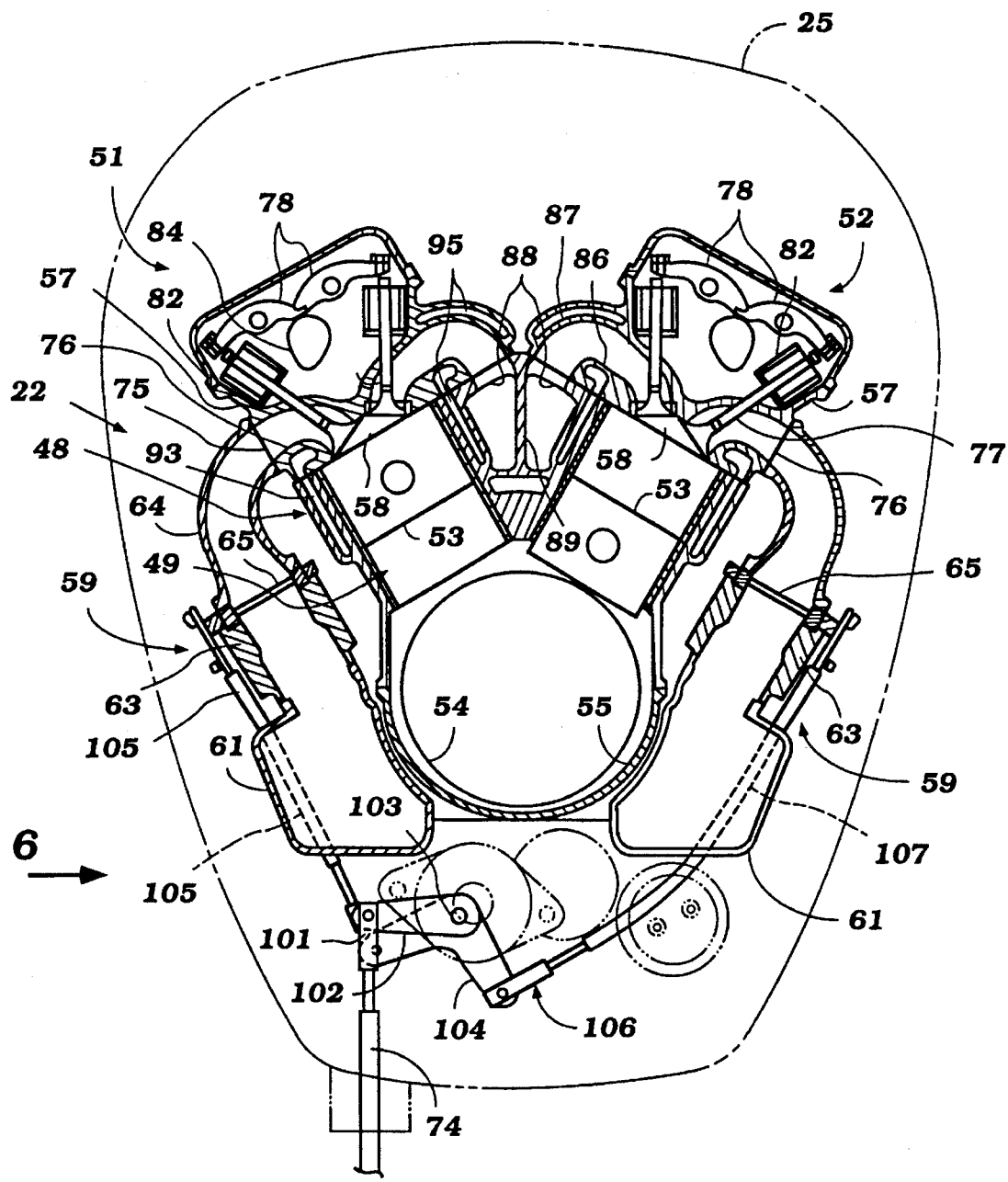
FIG. 5 is a cross-sectional view, in part similar to FIG. 2, and shows another embodiment of the invention.
Figure 6:
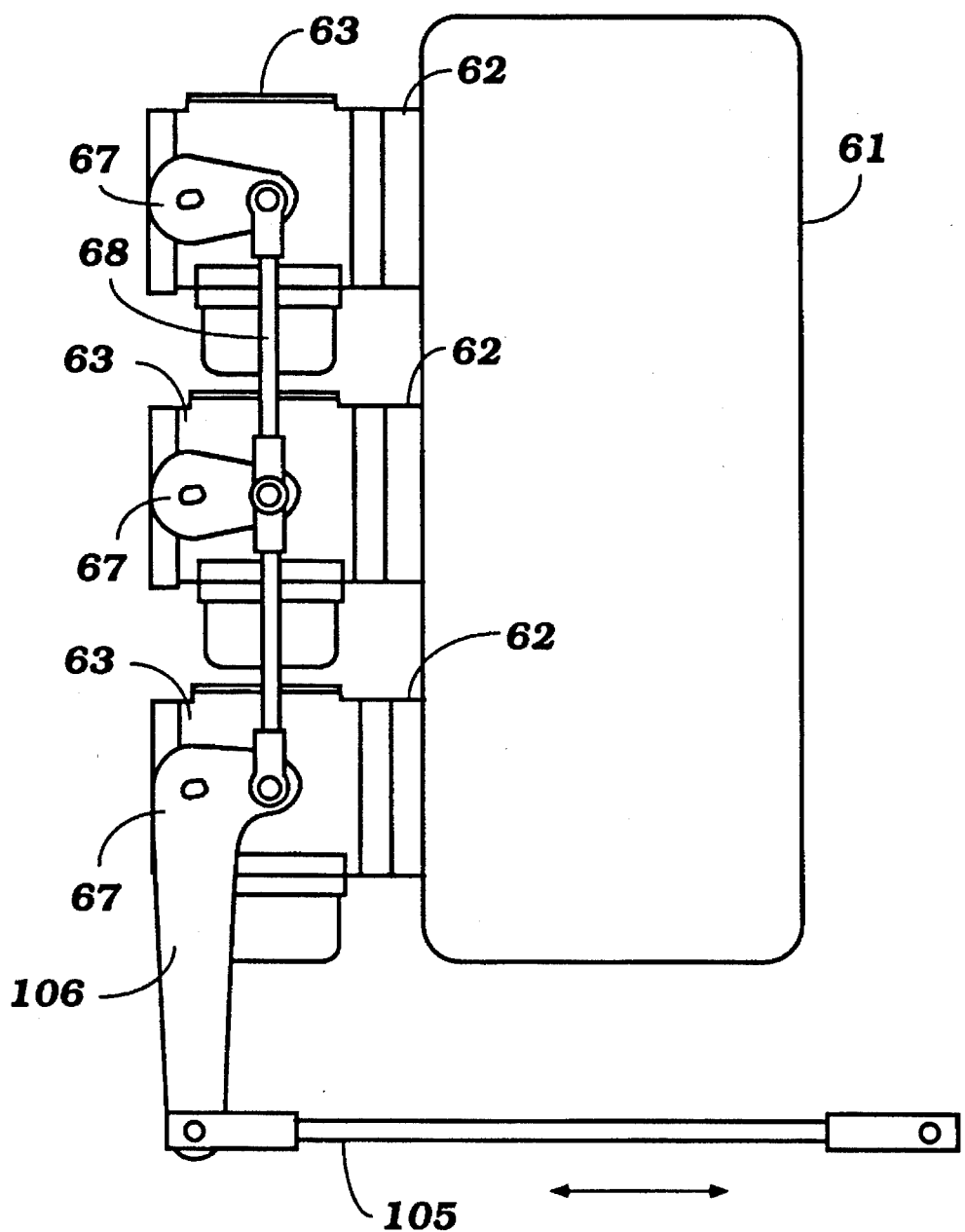
FIG. 6 is a view taken in the direction of the arrow 6 in FIG. 5 and shows the throttle linkage of this embodiment.

FIGS. 5 and 6 show another embodiment which is substantially the same as the embodiment of FIGS. 1 through 4. This embodiment differs from the previously described embodiment only in the mechanism for actuating the throttle valves 65 of the carburetor 63 and for that reason all components of this embodiment which are the same as the previously described embodiment have been identified by the same reference numerals. Only the different elements employed in this embodiment will be described in detail because it is believed that those skilled in the art will readily understand how this embodiment functions and is operated.

In this embodiment, the remote throttle actuator bowden wire 54 is connected by means of a coupling 101 to a throttle control lever 102 that is affixed by means of a vertical shaft 103 to the upper end of a bellcrank 104. The bellcrank 104 has a first arm connected to a first wire actuator 105 which, in turn, is connected to a depending arm 106 of the throttle lever 67 of the lower most carburetor 63 of the cylinder bank 51. Hence, the throttle valves of all carburetors 63 of this cylinder bank will be operated simultaneously.

The other end of the bellcrank 104 is connected by means of a connector 106 to a second wire actuator 107 which is connected to a similar extension 107 of the throttle lever 67 of the lower most carburetor 63 of the cylinder bank 52 so as to actuate all of the throttle valve 65 associated with this cylinder bank simultaneously.

Figure 7:
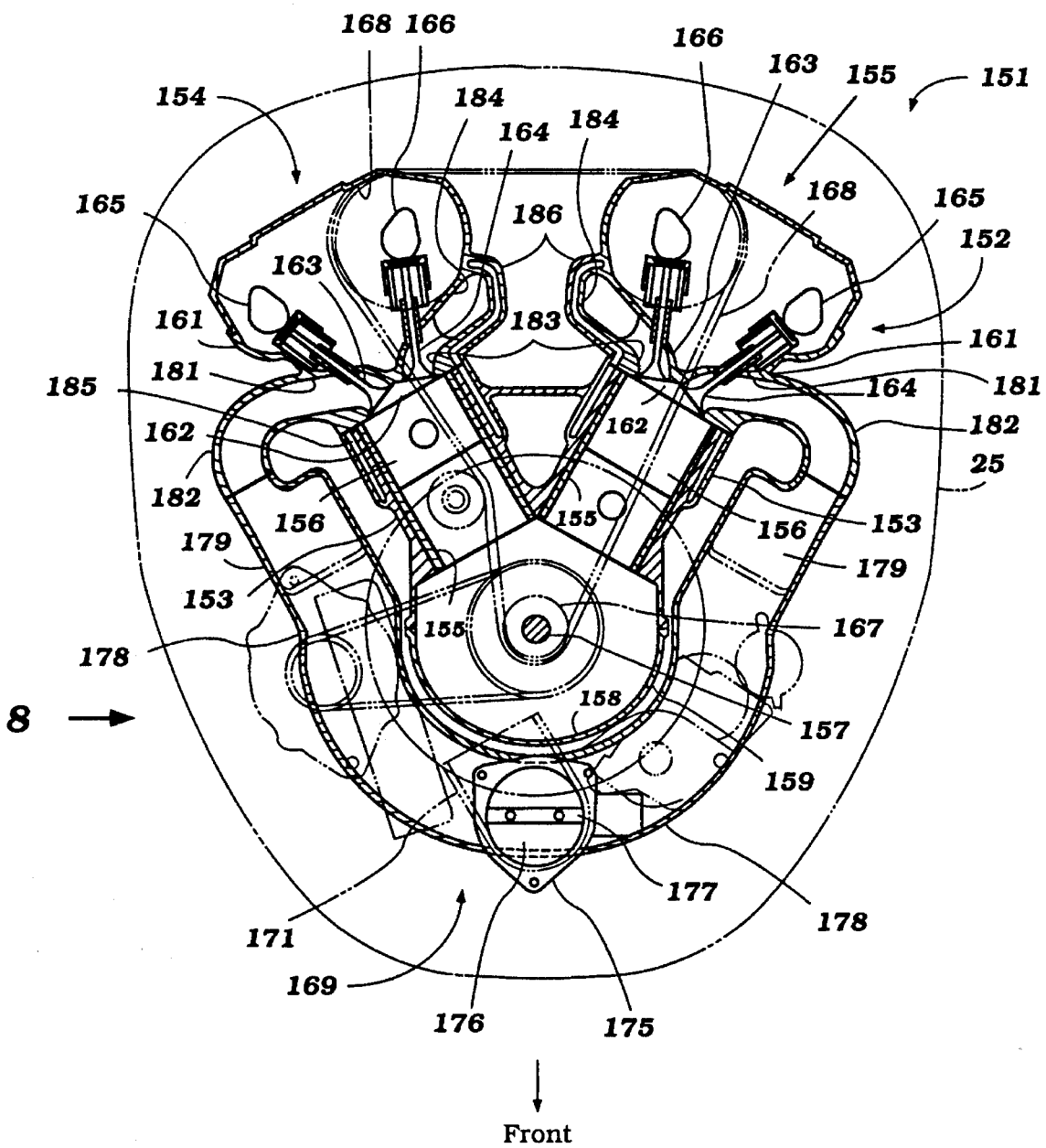
FIG. 7 is a cross sectional view, in part similar to FIGS. 2 and 5, and shows another embodiment of the invention.
Figure 8:
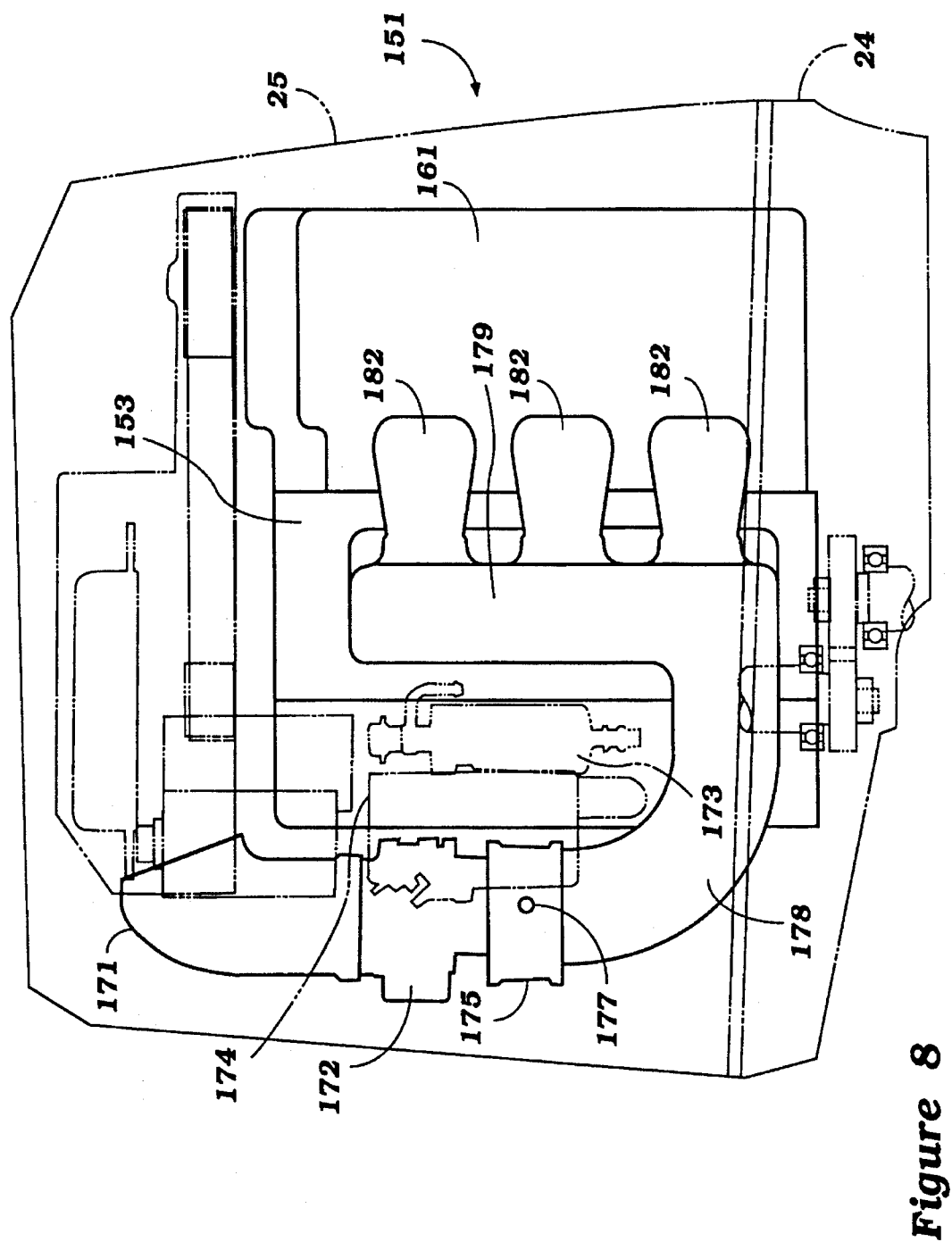
FIG. 8 is a view taken in the direction of the arrow 8 in FIG. 7 and shows the throttle control arrangement of this embodiment.

An outboard motor constructed in accordance with another embodiment of the invention is shown in FIGS. 7 and 8 and is identified generally by the reference numeral 151. This embodiment differs from the previously described embodiments only in the construction of the internal combustion engine, indicated generally by the reference 152 and, for that reason, only the powerhead of the outboard motor 151 is depicted. In addition, the protective cowling has the same construction as the previously described embodiments and thus has been illustrated only in phantom and has been identified by the same reference numerals as those previously applied.

This embodiment, like the previously described embodiment, is of the V-6 type and includes a cylinder block 153 having respective cylinder banks 154 and 155 that are disposed at a V-angle to each other. Cylinder liners form cylinder bores 155 in each cylinder bank and pistons 156 are reciprocally supported in the cylinder bores 155. The pistons 156 are connected by means of connecting rods (not shown) to drive a crankshaft 157 that is supported for rotation about a vertical axis within a crankcase chamber 158 formed by a crankcase member 159 that is affixed to the cylinder block 153 in a well known manner. Cylinder heads 161 are affixed to each of the cylinder banks 154 and 155 and have recesses 162 that form the combustion chambers along with the heads of the pistons 154 and the cylinder bores 155.

As with the previously described embodiment, each cylinder head 161 supports an intake valve 163 and an exhaust valve 164 for each combustion chamber 162. Unlike the previously described embodiment, however, in this embodiment the intake valves 163 are all operated by a common intake camshaft 165 in each cylinder bank while the exhaust valves 164 are operated by a separate common exhaust camshaft 166 for each cylinder bank 154 and 155. The exhaust camshafts 166 are driven from a sprocket 167 affixed to the crankshaft 157 by a single timing belt 168. The exhaust camshafts 166 drive the intake camshaft 165 through a suitable drive mechanism (not shown). As is typical with 4-cycle engine practice, the camshafts 165 and 166 rotate at one-half crankshaft speed.

The intake valves 163 are supplied with air from an induction system, indicated generally by the reference numeral 169 which includes an air inlet device 171 disposed at a point high in the outer cowling number 25 and which draws air from the area within the outer cowling assembly 23 as with the previously described embodiments. With this embodiment, however, a single air inlet device is provided for both the cylinder banks 154 and 155. This air inlet device 171 delivers air to an air flow sensor 172 which may be of any type and which outputs an airflow signal to a fuel injection system for supplying fuel to the individual combustion chambers 162. This fuel injection system includes fuel injectors (not shown) that inject fuel either directly into the combustion chamber recesses 162 or into the inlet ports of the engine, yet to be described.

This fuel injection system includes a high pressure fuel pump 173 that delivers air to a fuel vapor separator 174 and then to the fuel injectors. The fuel injection system may be of any known type and, for that reason, further discussion of it is not believed to be necessary for those skilled in the art to understand and practice the invention.

The air flow measuring device 172, in turn, supplies air to a common throttle body 175 having a throttle valve 176 mounted on a throttle valve shaft 177 and which is controlled in any known manner so as to control the speed of the engine.

From the throttle body 175, there are provided a pair of Y-branch conduits 178 each of which extends to a respective one of the cylinder banks 154 and 155. These branch conduits 178 communicate with a plenum chamber 179 that is disposed on a respective side of the banks 154 and 155 so as to offer a compact construction, as with the previously described embodiments. The plenum chambers 179 each serve intake passages 181 formed in the cylinder heads 161 and which terminate at valve seats that are controlled by the intake valves 163 via runners 182. If manifold fuel injection is employed, the fuel injectors may inject either into the runners 182 or into the cylinder head intake passages 181, either type of system being as well known in this art.

The exhaust valves 164 cooperate with exhaust passages 183 formed in the exhaust side of the cylinder heads 161. These exhaust passages 183 communicate with manifold sections 184 that are formed, in this embodiment, integrally with the cylinder heads 161 and extend downwardly so as to serve the exhaust pipe 34 as with the previously described embodiments.

In this embodiment, the engine 152 is also water cooled and the cylinder block 153 has cylinder block cooling jackets 185 while the cylinder heads 161 have cooling jackets including portions 186 that encircle the exhaust manifolds 184 and provide cooling for them. The coolant is then discharged downwardly into the exhaust pipe 34 as with the previously described embodiment.

Figure 9:
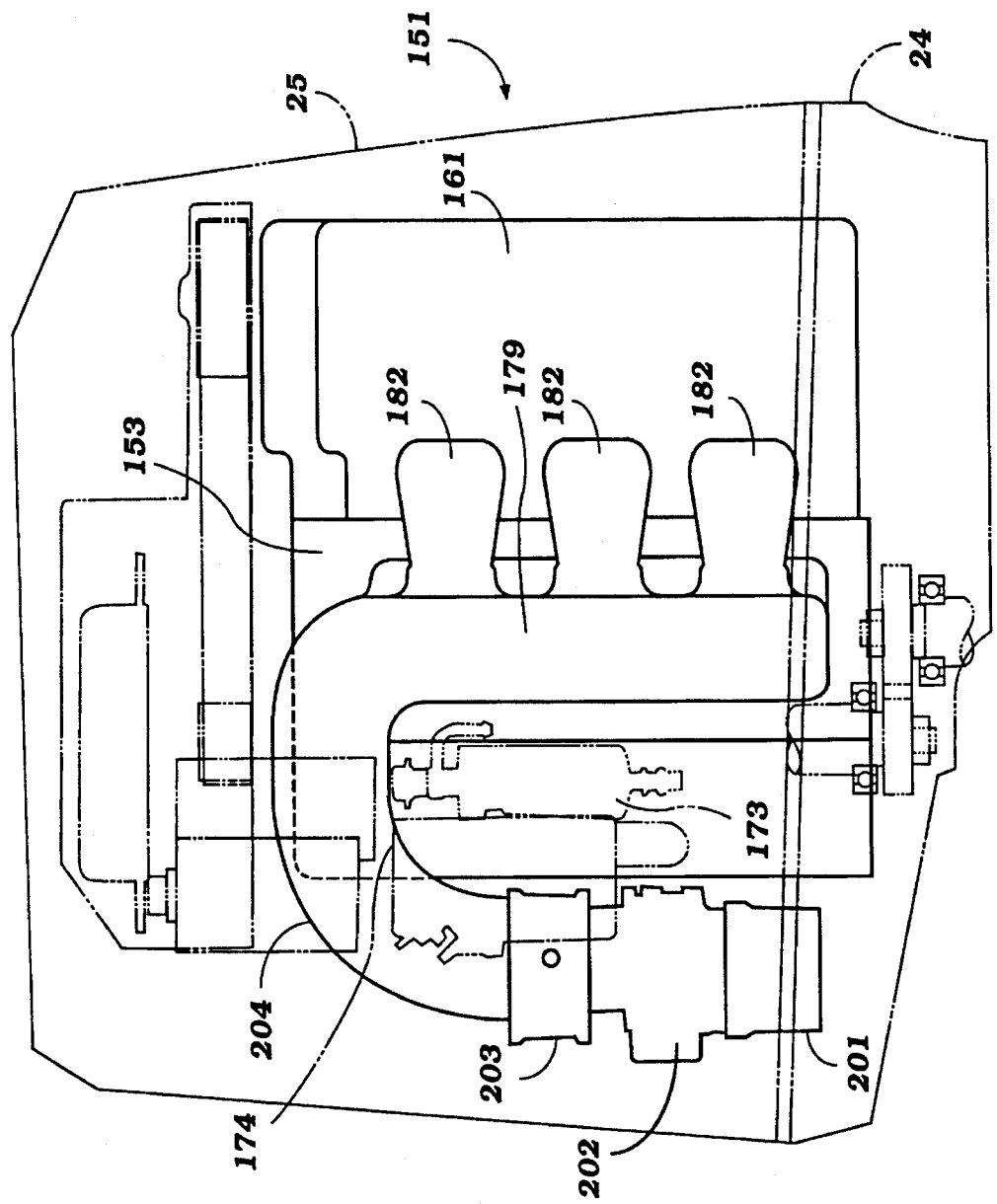
FIG. 9 is a side elevational view taken in the same direction as FIG. 8 and shows another embodiment of throttle valve arrangement.

FIG. 9 shows another embodiment of the invention which is generally the same as the embodiment of FIGS. 7 and 8 and, for that reason, components of this embodiment which are the same as the previously described embodiment have been identified by the same reference numerals and will be described again only insofar as is necessary to understand the construction and operation of this embodiment.

In the embodiment of FIGS. 7 and 8, the air inlet device 171 extended upwardly to the top of the main cowling member 25 while in this embodiment the air inlet device, indicated by the reference numeral 201, extends downwardly into the tray portion 24 where it draws air. This air is then delivered to an air flow measuring device 202 which is positioned upstream of a throttle body 203 in which a throttle valve is positioned for controlling the speed of the engine. From the throttle body 203 there are provided a pair of inverted U-shape sections 204 of a Y-pipe section that extends to the plenum chambers 179 at each side of the engine. Hence, rather than having a U-shape connector section and a down draft flow from the air inlet to the plenum chambers 179, this embodiment has an updraft flow to the upper sides of the plenum chambers 179. Aside from this, the construction is the same as that of FIGS. 7 and 8.

Figure 10:
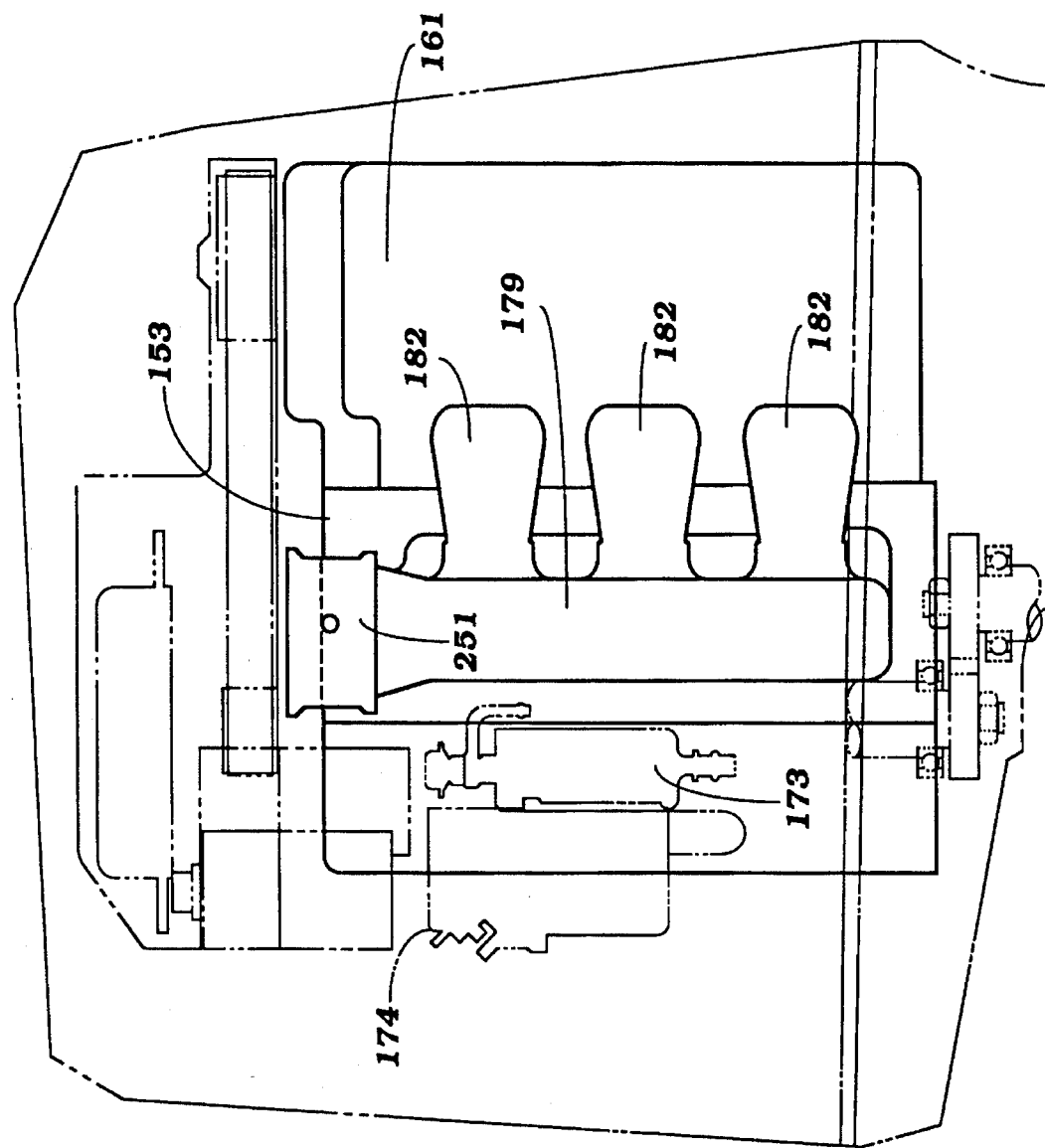
FIG. 10 is a view, in part similar to FIGS. 8 and 9 and shows a still further arrangement of throttle valve which may be employed in conjunction with the invention.

FIG. 10 shows yet another embodiment of the invention which is similar to the embodiments of FIG. 7 and 8 and FIG. 9 and differs only in which the way the air is introduced to the plenum chambers 179. For this reason, only a single view is necessary to understand this embodiment and where the components are the same as the previously described embodiments, they have been identified by the same reference numerals and will be described again only insofar as is necessary to understand the construction and operation of this embodiment.

In this embodiment, each plenum chamber 179 is provided with a throttle body 251 at its upper end which receives atmospheric air from a suitable air intake device. The throttle valves in the throttle bodies 251 may be operated by a linkage system of the type shown in either FIGS. 1 through 4 or FIGS. 5 and 6. Alternatively, other forms of throttle operating mechanisms may be employed so as to insure synchronism from one bank of the engine to the other. Also, any form of air inlet device and air measurement system may be employed with this embodiment and it can comprise either a separate air inlet and air measurement device for each bank of the engine or a common one for both banks that serves the throttle bodies 251 of the respective banks.

Figure 11:
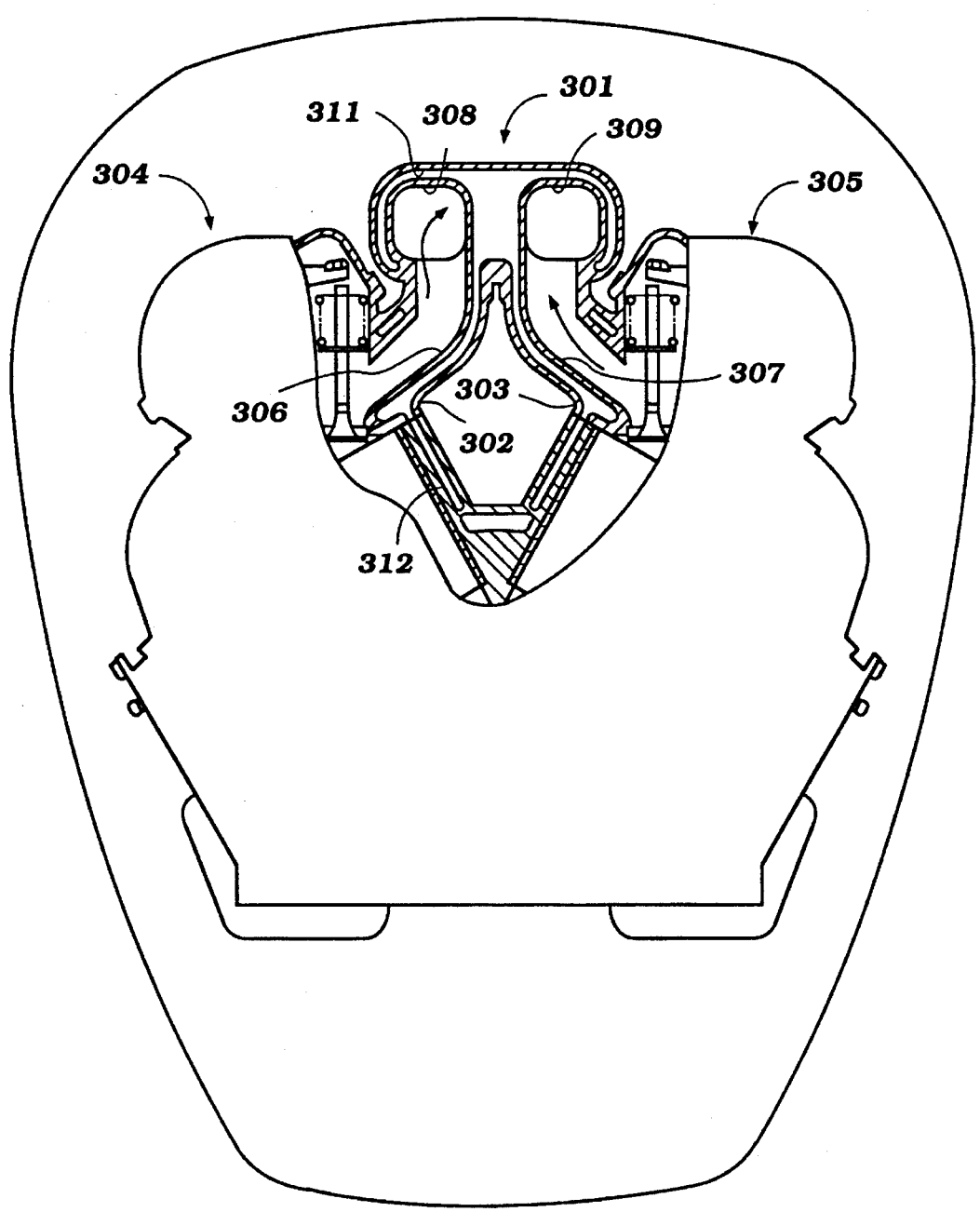
FIG. 11 is a top plan view, in part similar to FIGS. 2, 5 and 7, with only a portion broken away, and shows another embodiment of the invention.
Figure 12:
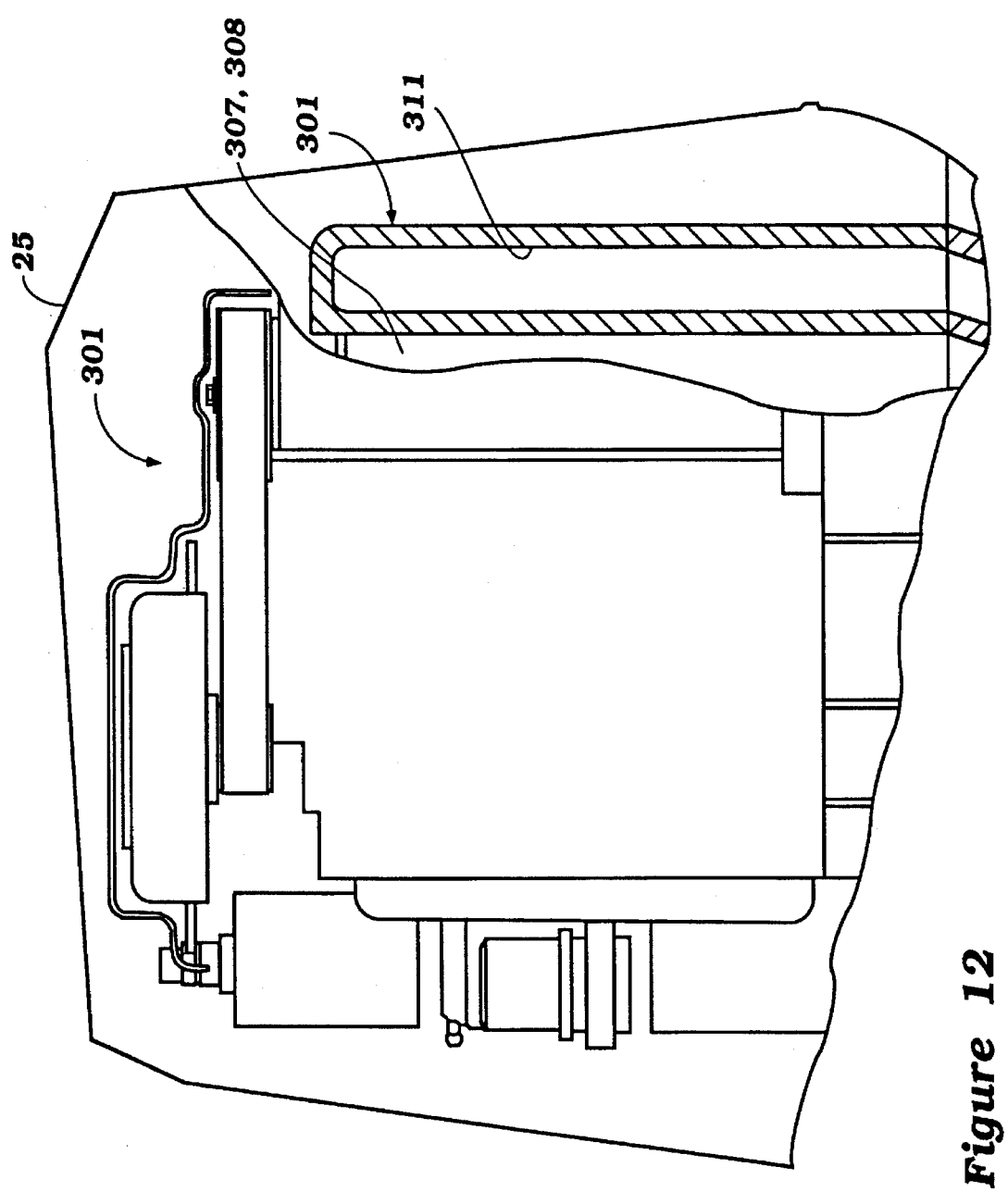
FIG. 12 is a partial side elevational view of the embodiment of FIG. 11, with a portion broken away so as to show the construction of the exhaust manifold of this embodiment.

FIGS. 7 through 10 showed a number of embodiments of engines having the exhaust manifolds formed in the cylinder heads rather than the cylinder block as the embodiments of FIGS. 1 through 4 and 5 and 6. Also, the embodiments of FIGS. 7 through 10 employed a 4-cam or 2-camshaft per bank type of valve actuating mechanism. FIGS. 11 and 12 show an embodiment wherein the exhaust manifolds are formed in the cylinder heads but a single camshaft arrangement as employed. Thus, this embodiment is similar to the embodiments of FIGS. 1 through 4, 5 and 6 in some regards and the embodiments of FIG. 7 through 10 in other embodiments. Since the main difference is how the exhaust manifolds are formed, only that portion of the engine and the cooling system associated there,for have been illustrated. Also, in this embodiment a single cylinder head assembly is employed for both cylinder banks and this cylinder head assembly is indicated generally by the reference numeral 301 and has respective portions 302 and 303 formed integrally therewith which cooperate with the respective cylinder banks 304 and 305, respectively.

A pair of exhaust passages 306 and 307 are formed in the opposite sides of the cylinder head assembly 301 and each merges into a common manifold section 308 and 309, both of which are formed in the valley between the cylinder banks 304 and 305. A cooling jacket 311, which receives coolant from the cylinder block cooling jacket 312, encircles both the passages 306 and 307 and also the manifolds 308 and 309 so as to provide adequate cooling. In all other regards, this embodiment is the same as those previously described as noted before and therefore further description of this embodiment is not believed to be necessary to permit those skilled in the art to practice the invention.

It should be readily apparent from the foregoing description that the described embodiments of the invention provide a V-type engine that can be employed conveniently with outboard motor applications due to the fact that the exhaust passages and exhaust manifold is formed in the valley between the cylinder banks and the induction system is provided outside of the engine but nevertheless in a compact arrangement. Of course, the described embodiments of the invention are preferred embodiments but various changes and modifications may be made without departing from the spirit and scope of the invention, as defined by the appended claims.

We claim:

1. An outboard motor comprised of a powerhead having an internal combustion engine and a surrounding protective cowling, a driveshaft housing lower unit depending from said powerhead and containing a propulsion device driven by said engine for propelling an associated watercraft, said engine comprising a V-type 4-cycle engine comprising a pair of angularly disposed cylinder banks each containing at least one cylinder bore and defining a valley therebetween, cylinder heads affixed to said cylinder banks at one end of said cylinder bore and having at least exhaust passages formed therein extending from exhaust valve seats on the valley side thereof to exhaust outlet openings, exhaust valves supported in said cylinder heads for controlling the opening and closing of said exhaust valve seats, pistons reciprocating in said cylinder bores and driving a crankshaft journalled at the other end of said cylinder bores about a vertically disposed axis for driving said propulsion device, said exhaust outlet openings each opening into the valley between said cylinder banks, and an exhaust manifold for transferring exhaust gases from said exhaust ports down from said powerhead into said driveshaft housing and lower unit for discharge to the atmosphere.

2. An outboard motor as described in claim 1, wherein the exhaust manifold is formed at least in substantial part in the cylinder block.

3. An outboard motor as described in claim 2, wherein the cylinder head exhaust passages comprise U-shape sections extending upwardly from the value seats formed in combustion chambers formed therein and then curving downwardly to exist the cylinder heads and enter the cylinder block through openings formed in engaging surfaces thereof.

4. An outboard motor as described in claim 3, further including cooling jacket means formed in the cylinder head for cooling the exhaust passages.

5. An outboard motor as described in claim 4, wherein the cylinder head cooling jackets encircled both the inner and outer portions of the U-shaped parts of the exhaust passages.

6. An outboard motor as described in claim 5, wherein there is provided an exhaust manifold for each bank of cylinders separated from each other by a common wall in the cylinder block.

7. An outboard motor as described in claim 2, further including intake passage formed in the cylinder heads and extending outwardly from intake value seats formed in the combustion chambers to intake ports formed in the outer surfaces of the cylinder heads spaced away from the valley between the cylinder banks.

8. An outboard motor as described in claim 7, further including an induction system disposed on each side of the engine for supplying at least an air charge to the intake passages.

9. An outboard motor as described in claim 7, further including a flow-controlling throttle valve in each of the induction systems.

10. An outboard motor as described in claim 9, wherein the intake for the induction system is disposed adjacent the crankcase.

11. An outboard motor as described in claim 9, wherein the throttle valves are disposed between the respective intake and the cylinder head inlet passages and rotate about horizontally disposed axes are actuated by a common actuator from an actuating shaft rotatable also about a horizontally disposed axis.

12. An outboard motor as described in claim 9, wherein the throttle valves are disposed between the respective intake and the cylinder head inlet passages and rotate about horizontally disposed axes are actuated by a common actuator from an actuating shaft rotatable about a vertically disposed axis.

13. An outboard motor as described in claim 1, further including cooling jacket means formed in the cylinder heads for cooling the exhaust manifolds.

14. An outboard motor as described in claim 13, wherein the cooling jacket means completely encircles the exhaust manifolds.

15. An outboard motor as described in claim 1, further including intake passages formed in the cylinder heads and extending outwardly from intake value seats formed the combustion chambers to intake ports formed on the outer surfaces of the cylinder heads spaced away from the valley between the cylinder banks.

16. An outboard motor as described in claim 15, wherein the induction systems terminate adjacent the crankcase of the engine.

17. An outboard motor as described in claim 16, further including a common air inlet for each of the induction systems.

18. An outboard motor as described in claim 17, further including a throttle valve positioned in the common air inlet for controlling the flow to each of the induction systems.

19. An outboard motor as described in claim 18, wherein the air inlet is disposed vertically above the throttle valve means and there is a down flow relationship to a pair of branch pipes each of which serves a respective one of the cylinder banks.

20. An outboard motor as described in claim 18, wherein the air inlet is disposed beneath the throttle valve means for an upflow of air therethrough and further including a branch conduit positioned above the throttle valve means and serving each of the induction systems.

21. An outboard motor as described in claim 16, wherein the induction passages at the sides of the engine are disposed adjacent the cylinder heads and are served by a respective throttle valve disposed on the sides of the cylinder head.

* * * * *